(12) United States Patent
Lee et al.

(10) Patent No.: US 11,873,923 B2
(45) Date of Patent: Jan. 16, 2024

(54) PIPE FITTING HAVING ANTI-LOOSENING STRUCTURE

(71) Applicants: PPI PYUNGWHA CO., LTD, Hwaseong-si (KR); PPI America Inc., Chicago, IL (US)

(72) Inventors: Hye-Jung Lee, Chicago, IL (US); Jong-Tae Lee, Seoul (KR); Ki-Woong Hwang, Yangju-si (KR)

(73) Assignees: PPI PYUNGWHA CO., LTD, Hwaseong-si (KR); PPI AMERICA INC., Chicago, IL (US)

( * ) Notice: Subject to any disclaimer, the term of this patent is extended or adjusted under 35 U.S.C. 154(b) by 944 days.

(21) Appl. No.: 16/585,072

(22) Filed: Sep. 27, 2019

(65) Prior Publication Data
US 2020/0370684 A1    Nov. 26, 2020

(30) Foreign Application Priority Data
May 24, 2019   (KR) .......................... 10-2019-0061257

(51) Int. Cl.
*F16L 19/00*   (2006.01)
*F16L 19/065*  (2006.01)

(52) U.S. Cl.
CPC .......... *F16L 19/005* (2013.01); *F16L 19/0653* (2013.01)

(58) Field of Classification Search
CPC ..... F16L 19/005; F16L 19/0653; F16L 17/02; F16L 17/06; F16L 19/02; F16L 21/02; F16L 21/04; F16L 19/07
See application file for complete search history.

(56) References Cited

U.S. PATENT DOCUMENTS

| | | | | |
|---|---|---|---|---|
| 2,021,745 A | * | 11/1935 | Pfefferle | ............... F16L 19/061 |
| | | | | 285/353 |
| 2,114,771 A | * | 4/1938 | Lionel | ..................... F16L 19/07 |
| | | | | 285/341 |

(Continued)

FOREIGN PATENT DOCUMENTS

| | | |
|---|---|---|
| EP | 2056009 A2 | 5/2009 |
| EP | 2411721 A1 | 2/2012 |

(Continued)

OTHER PUBLICATIONS

Extended European Search Report dated Apr. 15, 2021 in connection with the counterpart European Patent Application No. EP20706047.6.

(Continued)

*Primary Examiner* — Matthew Troutman
*Assistant Examiner* — Fannie C Kee
(74) *Attorney, Agent, or Firm* — Hauptman Ham, LLP

(57) ABSTRACT

A pipe-fitting includes a plurality of pipe receiving portions, a hollow joint for connecting the plurality of pipe receiving portions to each other, a sealing member received in a sealing member-receiving groove, and a plurality of hollow fixing-caps, wherein each fixing-cap is screwed to a distal end of each pipe receiving portion to press the sealing member to be brought into close contact with each pipe. A fixing-cap stopper is formed on an outer circumferential face of each pipe receiving portion. The fixing-cap stopper includes a fixing-cap fixing portion including a plurality of fixing protrusions protruding toward a proximal end of the fixing-cap. A plurality of fixing-protrusion-receiving grooves is defined in the proximal end of each fixing-cap for receiving the fixing-protrusions therein respectively.

6 Claims, 11 Drawing Sheets

(56) References Cited

U.S. PATENT DOCUMENTS

| | | | | |
|---|---|---|---|---|
| 2,269,695 | A * | 1/1942 | Scharf | F16L 19/08 |
| | | | | 285/342 |
| 2,452,278 | A * | 10/1948 | George, V | F16L 19/02 |
| | | | | 285/348 |
| 2,561,887 | A * | 7/1951 | Risley | F16L 19/02 |
| | | | | 285/341 |
| 3,986,736 | A * | 10/1976 | Takagi | F16L 19/12 |
| | | | | 285/341 |
| 4,353,580 | A * | 10/1982 | Houck | F16L 41/14 |
| | | | | 285/19 |
| 4,475,748 | A * | 10/1984 | Ekman | F16L 19/005 |
| | | | | 285/388 |
| 4,801,160 | A | 1/1989 | Barrington | |
| 6,988,746 | B2 * | 1/2006 | Olson | F16L 19/12 |
| | | | | 285/353 |
| 9,671,049 | B1 * | 6/2017 | Crompton | F16L 19/07 |
| 2001/0013700 | A1 * | 8/2001 | Mintz | F16L 21/04 |
| | | | | 285/360 |
| 2003/0197380 | A1 * | 10/2003 | Chelchowski | F16L 19/065 |
| | | | | 285/354 |
| 2006/0202478 | A1 * | 9/2006 | Guest | F16L 19/005 |
| | | | | 285/322 |
| 2007/0007766 | A1 | 1/2007 | Bennett et al. | |
| 2017/0241578 | A1 * | 8/2017 | Kim | F16L 19/005 |
| 2019/0063643 | A1 | 2/2019 | Lee et al. | |

FOREIGN PATENT DOCUMENTS

| | | | | |
|---|---|---|---|---|
| EP | 3428498 | A1 * | 1/2019 | ............ F16L 21/04 |
| FR | 2079912 | A6 * | 11/1971 | ............ F16L 19/07 |
| GB | 525153 | A * | 8/1940 | ............ F16L 19/07 |
| GB | 742110 | A * | 12/1955 | ............ F16L 19/07 |
| GB | 2525685 | A | 11/2015 | |
| JP | 2019505734 | A | 2/2019 | |
| KR | 1995-0004441 | Y1 | 4/1994 | |
| KR | 10-1755002 | B1 | 7/2017 | |
| WO | 2010108820 | A1 | 9/2010 | |
| WO | 2018047227 | A1 | 3/2018 | |

OTHER PUBLICATIONS

Japanese Notice of Allowance dated Jun. 15, 2021, in connection with the Japanese Patent Application No. 2019-210879.

[Supportive Materials for Exception to Loss of Novelty] "KOREA International Builders' Show 2019 KOREA Pavilion Catalog", International Builders' Show, Feb. 19-21, 2019, p. 22-23, Las Vegas Convention Center.

Japanese Office Action dated Jan. 5, 2021 in connection with the Japanese Patent Application No. 2019-210879.

* cited by examiner

PIPE FITTING HAVING ANTI-LOOSENING STRUCTURE

CROSS-REFERENCE TO RELATED APPLICATIONS

This application claims the priority of Korean Patent Application No. 10-2019-0061257 filed on May 24, 2019, in the Korean Intellectual Property Office, the disclosure of which is hereby incorporated by reference in its entirety.

BACKGROUND

1. Technical Field

The present disclosure relates to a pipe-fitting with an one-touch fitting structure and an anti-loosening structure.

2. Description of the Related Art

A pipe is mainly used for transporting fluid (gas or liquid) or powder. The pipes are connected to each other to define a pipeline. Piping means configuring the pipeline based on a fluid flow rate, a property value, and a frictional resistance.

In piping work, a number of pipes are connected to one another. In this connection, a pipe-fitting is used to change a direction of the pipeline or branch the pipeline. The pipe-fitting is constructed for connecting a pipe and a pipe, and has various shapes depending on applications thereof.

Various connection schemes are used to connect the pipe and the pipe-fitting. Conventionally, a scheme of fixing a pipe to a pipe-fitting using an adhesive such as a bond is used. Recently, a scheme of fixing a pipe and a pipe-fitting by inserting the pipe into the pipe-fitting and screwing a fixing-cap onto an end of the pipe-fitting is used.

However, according to the prior art, when the pipe and pipe-fitting is fixed to each other by screwing the fixing-cap to the end of the pipe-fitting, an external impact is applied to the pipe or pipe-fitting, or vibration occurs in a place where the pipeline is installed, the fixing-cap may be unscrewed. When the fixing-cap is loosened, a gap between the pipe and the pipe-fitting is not sealed, and thus fluid flowing inside the pipe flows out through the gap between the pipe and the pipe-fitting.

Further, according to the prior art, when the fixing-cap is screwed to the end of the pipe-fitting to connect the pipe thereto, it may be inconvenient that the user has to apply a considerable force in order to fix the fixing-cap more firmly.

Moreover, according to the prior art, when fixing the pipe and pipe-fitting to each other by screwing the fixing-cap to the end of a pipe-fitting, there may occur a problem that the pipe is inclined or detached from the pipe-fitting due to a length or weight of the pipe, movement or weight of the fluid flowing inside the pipe, and the like.

SUMMARY

One purpose of the present disclosure is to provide a pipe-fitting in which a fixing-cap from is prevented from being unscrewed from a main body of the fitting due to external impact or vibration while a pipe is coupled to the pipe-fitting via the fixing-cap.

Further, another purpose of the present disclosure is to provide a pipe-fitting that allows a user to easily attach a fixing-cap to an end of a pipe receiving portion using a small force.

Further, still another purpose of the present disclosure is to provide a pipe-fitting capable of preventing a pipe from being detached from a main body of the fitting or being tilted when the pipe is connected thereto.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In one aspect, there is proposed a pipe-fitting comprising: a main body including: a plurality of pipe receiving portions for receiving a plurality of pipes therein respectively; and a hollow joint for connecting the plurality of pipe receiving portions to each other; a sealing member received in a sealing member-receiving groove defined in a distal end of each pipe receiving portion, wherein the sealing member is configured to seal between each pipe receiving portion and each pipe inserted into each pipe receiving portion; and a plurality of fixing-caps, each having a through-hole defined therein through which each pipe passes, wherein each fixing-cap is screwed to the distal end of each pipe receiving portion to press the sealing member to be brought into close contact with each pipe, wherein a fixing-cap stopper is formed on an outer circumferential face of the distal end of each pipe receiving portion, wherein the fixing-cap stopper contacts a proximal end of the fixing-cap when each fixing-cap is screwed to the distal end of each pipe receiving portion, wherein the fixing-cap stopper includes a fixing-cap fixing portion including a plurality of fixing protrusions protruding toward the proximal end of the fixing-cap, wherein a plurality of fixing-protrusion-receiving grooves is defined in the proximal end of each fixing-cap for receiving the fixing-protrusions therein respectively.

In one implementation, a pipe support portion is formed on the distal end of the fixing-cap so as to extend stepwise to define the distal end of the fixing-cap.

In one implementation, each fixing-cap includes: an annular portion defining the through-hole; a skirt portion extending from an edge of the annular portion in an insertion direction of each pipe; and a pressing portion formed between an inner circumferential face of the annular portion and an inner circumferential face of the skirt portion, wherein the pressing portion has an inner inclined face at a predetermined inclination angle with respect to the inner circumferential face of the annular portion.

In one implementation, when each fixing-cap is screwed to the distal end of each pipe receiving portion while the sealing member is received in the sealing member-receiving groove, the pressing portion presses the sealing member so that at least a portion of the sealing member is deformed to be bent so as to be brought into close contact with each pipe.

In one implementation, a pressing protrusion extends from a proximal end of the pressing portion in the inserting direction of each pipe.

In one implementation, the inclination angle is in a range of 14 and 22 degrees.

In one implementation, when each fixing-cap is screwed to the distal end of each pipe receiving portion, each fixing-protrusion is received in each fixing-protrusion receiving groove to prevent rotation of each fixing-cap.

In one implementation, the fixing-cap fixing portion includes a plurality of fixing-cap fixing portions arranged on the fixing-cap stopper and spaced from each other by the same spacing.

In one aspect, there is proposed a method for connecting each pipe to the pipe-fitting as defined above. The method comprises: inserting the sealing member into the sealing member receiving groove; placing each fixing-cap on the distal end of each pipe receiving portion; inserting each pipe through the through-hole of each fixing-cap into each pipe receiving portion; and rotating each fixing-cap in a locking direction to be screwed to each pipe receiving portion.

In accordance with the present, the pipe-fitting may be realized in which the fixing-cap from is prevented from being unscrewed from the main body of the fitting due to external impact or vibration while the pipe is coupled to the pipe-fitting via the fixing-cap.

Further, in accordance with the present disclosure, the pipe-fitting may allow a user to easily attach the fixing-cap to an end of the pipe receiving portion using a small force.

Further, in accordance with the present disclosure, the pipe-fitting may be capable of preventing the pipe from being detached from the main body of the fitting or being tilted when the pipe is connected thereto.

The effect of the present disclosure is not limited thereto. Various effects may be included in the present disclosure.

DETAILED DESCRIPTIONS

Figure 1:
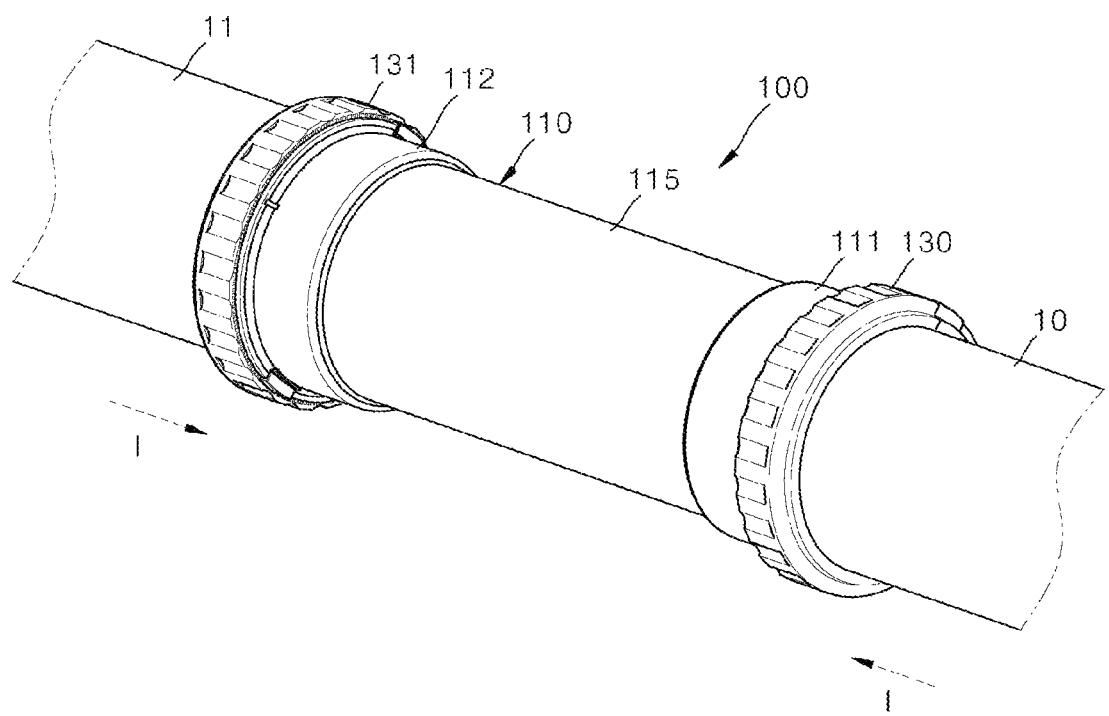
FIG. 1 shows a combination of a pipe-fitting and a pipe according to one embodiment of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

For simplicity and clarity of illustration, elements in the figures are not necessarily drawn to scale. The same reference numbers in different figures denote the same or similar elements, and as such perform similar functionality.

Descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "bound to", or "coupled to" another element or layer, it can be directly on, bound to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
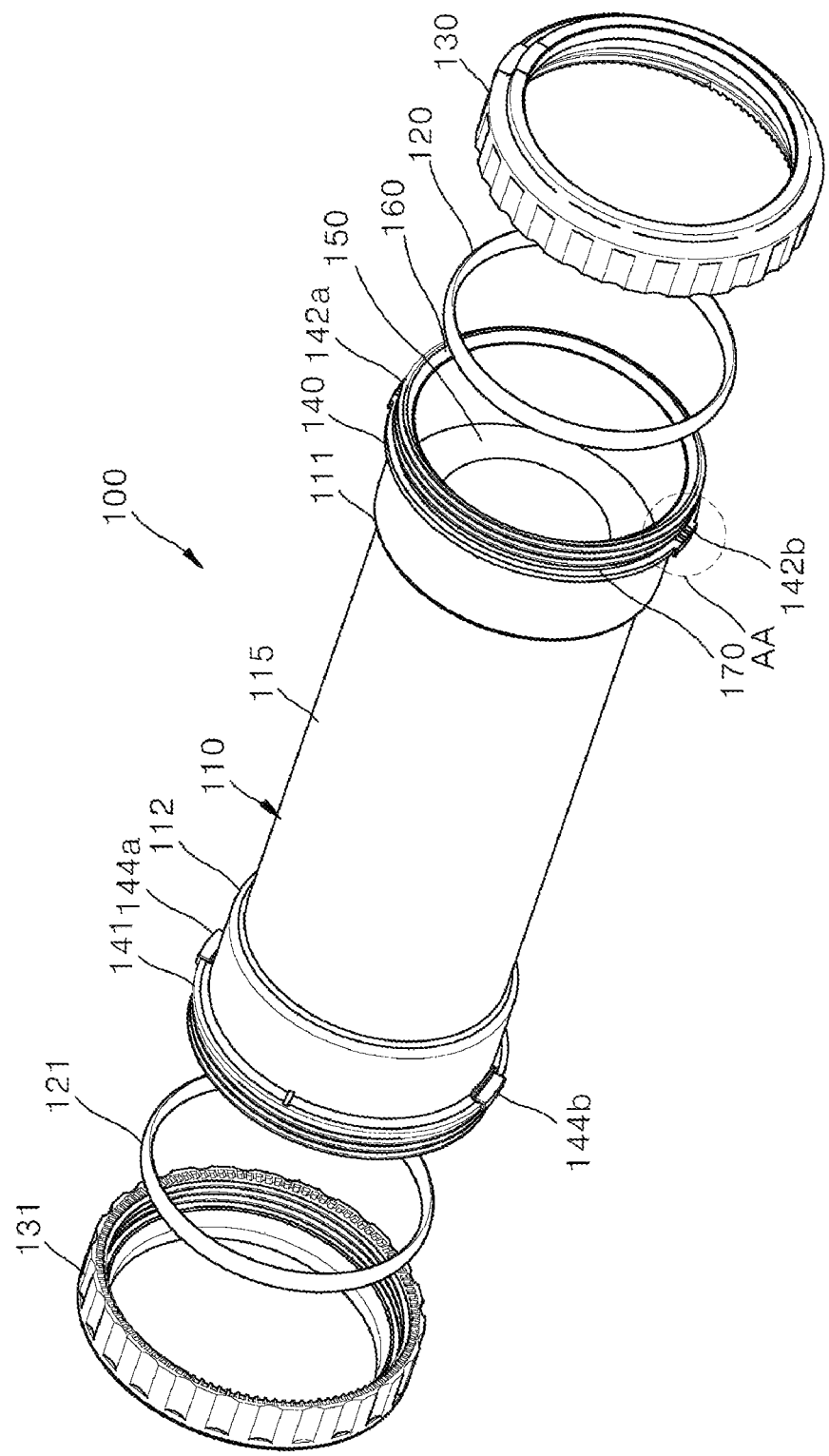
FIG. 2 shows a exploded view of the pipe-fitting according to one embodiment of the present disclosure.
Figure 3:
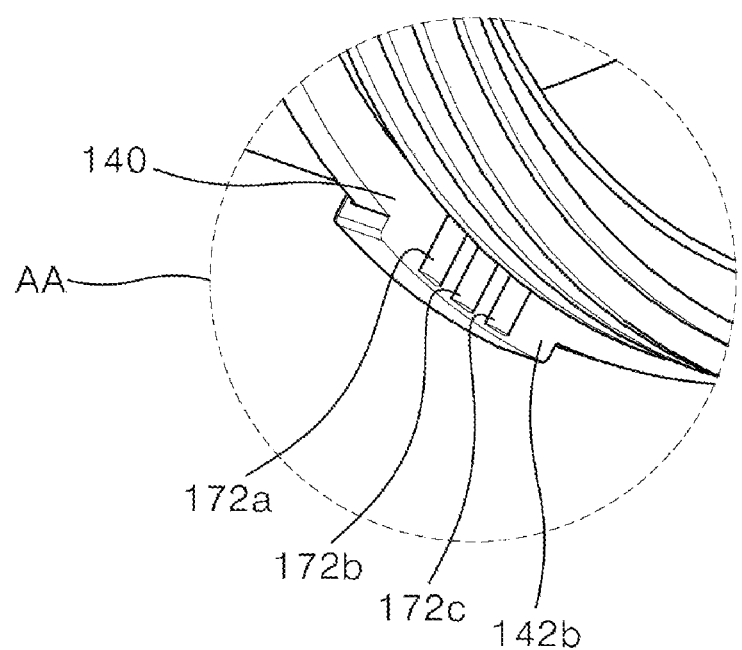
FIG. 3 is an enlarged view of a AA section shown in FIG. 2.

FIG. 1 shows a combination of a pipe-fitting and a pipe according to one embodiment of the present disclosure. FIG. 2 shows a exploded view of the pipe-fitting according to one embodiment of the present disclosure. FIG. 3 is an enlarged view of a AA section shown in FIG. 2.

Referring to FIGS. 1 to 3, a pipe-fitting 100 according to one embodiment of the present disclosure includes a main body 110, sealing members 120 and 121, and fixing-caps 130 and 131.

The main body 110 includes a plurality of pipe receiving portions 111 and 112 into which the pipes 10 and 11 are inserted respectively, and a hollow joint 115 connecting the plurality of pipe receiving portions 111 and 112 to each other.

Each of the pipe receiving portions 111 and 112 is connected to each end of the hollow joint 115 and has the same cross section shape as that of each of the pipes 10 and 11 to accommodate therein each of the pipes 10 and 11. An inner diameter of each of the pipe receiving portions 111 and 112 may be equal to or greater than an outer diameter of each of the pipes 10 and 11. As shown in FIG. 1, when a portion of an end of each of the pipes 10 and 11 is inserted into each of the pipe receiving portions 111 and 112, and each of the fixing-caps 130 and 131 is coupled with an end of each of the pipe receiving portions 111 and 112, the pipes 10 and 11 may be connected and fixed to the pipe-fitting 100.

The number of the pipe receiving portions may vary depending on a shape of the hollow joint 115 or the number of the pipes connected to the pipe-fitting 100.

The hollow joint 115 is disposed between the pipe receiving portions 111 and 112 to connect the pipe receiving portions 111 and 112 to each other. The hollow joint 115 has an empty hollow structure to allow fluid flowing through the pipes 10 and 11 to flow therethrough.

In one example, an embodiment in which the hollow joint 115 having a linear shape is shown in FIG. 1. However, the present disclosure is not limited thereto. The shape of the hollow joint 115 may vary depending on applications.

For example, the hollow joint 115 may have various shapes such as an L shape, a T shape, a Y shape, a cross shape. The number of the pipe receiving portions may vary depending on the shape of the hollow joint 115.

Further, although FIG. 1 shows the outer diameter of the hollow joint 115 being smaller than the outer diameter of each of the pipe receiving portions 111 and 112, the outer diameter of the hollow joint 115 may be equal to the outer diameter of each of the pipe receiving portions 111 and 112.

In one example, as shown in FIG. 2, the inner diameter of the hollow joint 115 may be smaller than the inner diameter of each of the pipe receiving portions 111 and 112. The inner diameter of the hollow joint 115 may be set to be smaller than the inner diameter of each of the pipe receiving portions 111 and 112 so that a pipe stopper 150 is formed to connect the hollow joint 115 and each of the pipe receiving portions 111 and 112 to each other.

The pipe stopper 150 may be embodied as a shoulder extending from the hollow joint 115 to each of the pipe receiving portions 111 and 112. In other words, the pipe stopper 150 connects the hollow joint 115 and each of the pipe receiving portions 111 and 112 in a stepped manner.

When the pipes 10 and 11 are respectively inserted into the pipe receiving portions 111 and 112, each of the pipe stopper 150 supports each of ends of the pipes 10 and 11. Therefore, the pipes 10 and 11 may be stopped by the pipe stopper 150.

Further, a sealing member receiving groove 160 is defined in each of ends of the pipe receiving portions 111 and 112 as shown in FIG. 2. The sealing member receiving groove 160 is recessed in an insertion direction I of each of the pipes 10 and 11 to receive the sealing member 120. Accordingly, the sealing member receiving groove 160 may have a shape corresponding to an end shape of the sealing member 120, for example, a V-shape or a U-shape.

The sealing member 120 is made of a material having elasticity such as rubber and has a ring shape so as to correspond to an inner face of each of the pipes 10 and 11. The inner diameter of the sealing member 120 is set larger than the outer diameter of each of the pipes 10 and 11. Accordingly, when the pipes 10 and 11 are respectively inserted into the pipe receiving portions 111 and 112, the sealing member 120 surrounds the outer peripheral surface of each of the pipes 10 and 11.

In one example, the sealing member 120 may have an elliptical cross-section with a long axis extending in the same direction as the insertion direction I of each of the pipe 10 and 11. When the sealing member 120 is inserted into the sealing member receiving groove 160, one end in the long axis direction of the sealing member 120 contacts a portion of the receiving portion defining the sealing member receiving groove 160, while the other end in the long side direction of the sealing member 120 is in contact with a pressing portion of each of the fixing-caps 130 and 131 as described later.

As described later, as the pipes 10 and 11 are respectively inserted into the pipe receiving portions 111 and 112, and then the fixing-caps 130 and 131 are respectively screwed to the distal ends of the pipe receiving portions 111 and 112, the other end in the long axis direction of the sealing member 120 is pressed inwardly of each of the pipe receiving portions 111 and 112 by each of the pressing portions of the fixing-caps 130 and 131. Accordingly, the other end in the long axis direction of the sealing member 120 is deformed to be bent inwardly each of the pipe receiving portions 111 and 112.

When the other end in the long axis direction of the sealing member 120 is deformed to be bent, the sealing member 120 closely contacts each of the peripheral surfaces of the pipes 10 and 11 to seal a space defined between each of the pipes 10 and 11 and each of the fixing-caps 130 and 131. This results in a seal between each of the pipes 10 and 11 and the pipe-fitting 100. Further, due to a frictional force between the sealing member 120 and each of the outer peripheral surfaces of the pipes 10 and 11, each of the pipes 10 and 11 may be prevented from being separated from the pipe-fitting 100.

As described above, the configuration that the sealing member 120 has an elliptical cross section with a long axis extending in the insertion direction I of each of the pipes 10 and 11 may result in an effect that a phenomenon may be remarkably reduced in which the sealing member 120 is pushed inwardly of each of the pipe receiving portions 111 and 112 by pression of each of the ends of the pipes 10 and 11 and/or the sealing member 120 is bitten by each of the ends of the pipes 10 and 11 when the operator inserts the pipes 10 and 11 into the pipe receiving portions 111 and 112 respectively.

The configuration that the inner diameter of the sealing member 120 is set to be equal to or greater than the inner diameter of each of the pipes 10 and 11 and the sealing member 120 has the elliptical cross-section shape may result in the effect that the phenomenon may be remarkably reduced in which the sealing member 120 is pushed inwardly of each of the pipe receiving portions 111 and 112 by pression of each of the ends of the pipes 10 and 11 and/or the sealing member 120 is bitten by each of the ends of the pipes 10 and 11 when the operator inserts the pipes 10 and 11 into the pipe receiving portions 111 and 112 respectively and thus each of the pipes 10 and 11 comes into contact with the sealing member 120. This is because when the pipes 10 and 11 are respectively inserted into the pipe receiving portions 111 and 112, each of the ends of the pipes 10 and 11 is first in contact with an end in a short axis of the elliptical cross section of the sealing member 120 instead of being in contact with the other end in a long axis of the sealing member 120 having the elliptical cross section.

Actually, the most frequently-occurring phenomenon when the pipe is connected to the pipe-fitting is the above-mentioned phenomenon that the sealing member 120 is pushed inwardly of each of the pipe receiving portions 111 and 112 by pression of each of the ends of the pipes 10 and 11 and/or the sealing member 120 is bitten by each of the ends of the pipes 10 and 11. Therefore, solving this problem is a very important purpose in a technology field to which the present disclosure belongs. Due to the mentioned phenomenon that the sealing member 120 is pushed and/or bitten, the operator must perform a process of inserting and removing the pipe several times in the process of combining the pipe and the pipe-fitting to each other. Further, after insertion of the pipe into the fitting, the operator may not recognize that the sealing member is pushed inwardly of each of the pipe receiving portions. In this case, fluid leaks frequently through a gap between the pipe and the pipe-fitting after the completion of the fitting operation.

However, in accordance with the present disclosure, due to the shape of the sealing member 120 and the bent deformation of the sealing member 120 by each of the pressing portions of the fixing-caps 130 and 131, the pushed and/or bitten phenomenon of the sealing member 120 is significantly reduced. This greatly reduces manpower and time required for the piping work and prevents the fluid flowing inside the pipe from leaking through the gap between the pipe and the pipe-fitting which may otherwise occur due to the pushed and/or bitten phenomenon of the sealing member after the piping construction.

As shown in FIG. 2, a thread 170 is formed on the outer circumferential face of the end of each of the pipe receiving portions 111 and 112. The thread 170 may be engaged with a thread formed on the inner face of each of the fixing-caps 130 and 131. Thus, each of the fixing-caps 130 and 131 may be screwed to each of the ends of the pipe receiving portions 111 and 112.

Further, as shown in FIG. 2, each of fixing-cap stoppers 140 and 141 may extend from the outer circumferential face of each of the ends of the pipe receiving portions 111 and 112 in a direction toward the outer circumferential face of the end of each of the pipe receiving portions 111 and 112. Thus, each of the fixing-cap stoppers 140 and 141 may contact and stop each of the other ends of the fixing-caps 130 and 131 when each of the fixing-caps 130 and 131 is engaged with each of the ends of the pipe receiving portions 111 and 112.

Further, each of the fixing-cap stoppers 140 and 141 may include each of a pair of fixing-cap fixing portions 142a and 142b and a pair of fixing-cap fixing portions 144a and 144b. The fixing-cap stopper may include at least one fixing protrusion protruding in a direction toward the other end of each of the fixing-caps 130 and 131.

For example, referring to a AA portion shown in FIG. 2 and the enlarged view thereof shown in FIG. 3, the fixing-cap stopper 140 includes a fixing-cap fixing portion 142b protruding in a direction toward the outer circumferential face of each of the ends of the pipe receiving portions 111 and 112. Further, fixing protrusions 172a, 172b, and 172c may protrude from a surface of the fixing-cap fixing portion 142b so as to protrude in a direction toward the other end of each of the fixing-caps 130 and 131, that is, toward the threaded face 170.

The fixing protrusions 172a, 172b, and 172c may be respectively accommodated in fixing protrusion receiving grooves defined in each of the fixing-caps 130 and 131 as described later. Each of the fixing protrusions 172a, 172b, and 172c may have a shape corresponding to a shape of each of the fixing protrusion receiving spaces.

The fixing protrusions 172a, 172b, and 172c are respectively received in the fixing protrusion receiving grooves defined in each of the fixing-caps 130 and 131, thereby preventing each of the fixing-caps 130 and 131 from being disengaged from each of the receiving portions due to external impact or vibration.

Hereinafter, a structure of the fixing-cap constituting the pipe-fitting according to one embodiment of the present disclosure will be described in detail with reference to the drawings.

Figure 4:
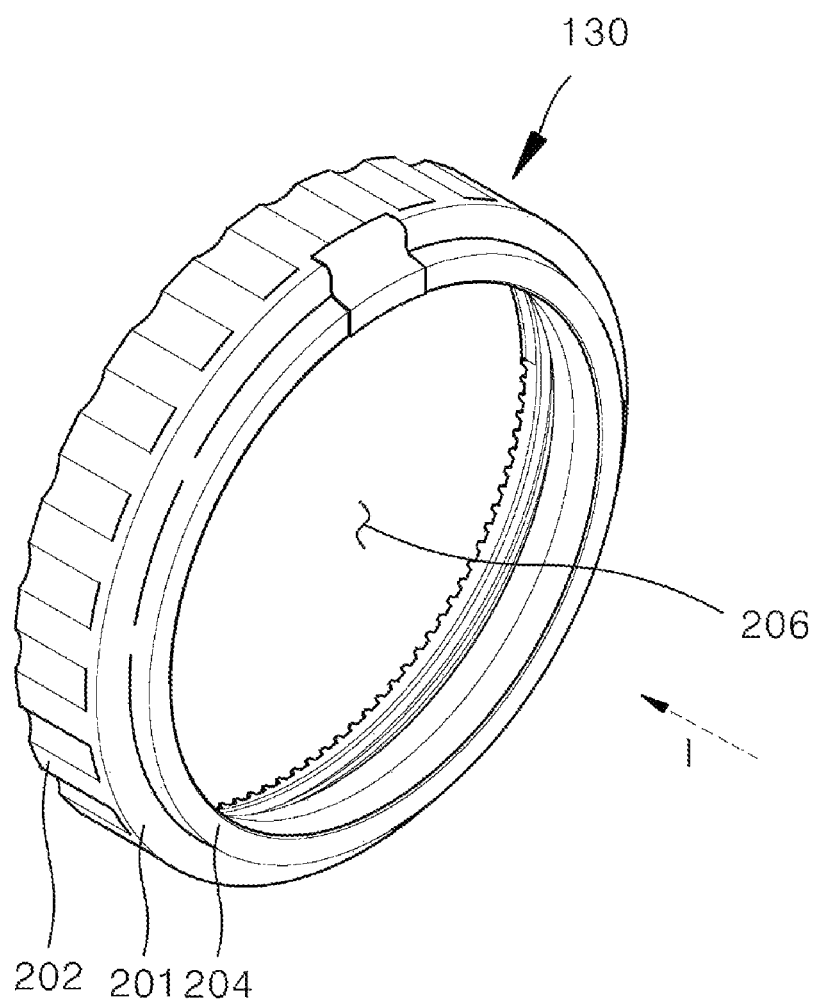
FIG. 4 shows one distal end of a fixing-cap that constitutes the pipe-fitting according to one embodiment of the present disclosure.
Figure 5:
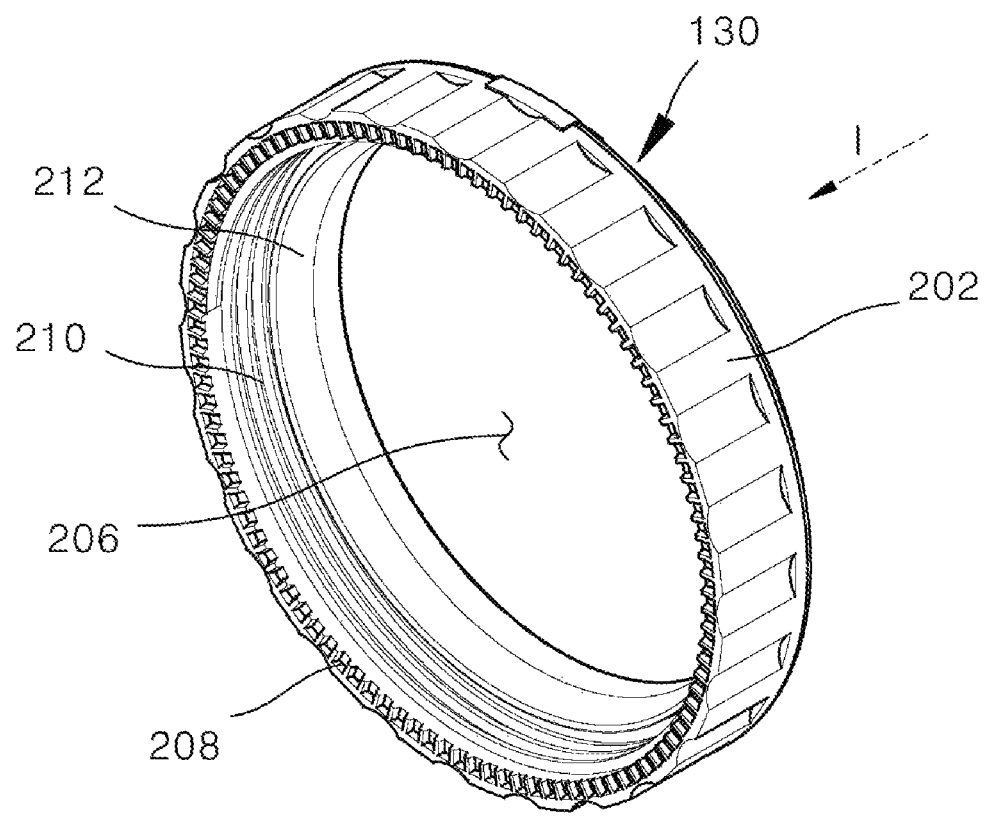
FIG. 5 shows the other distal end of the fixing-cap that constitutes the pipe-fitting according to one embodiment of the present disclosure.
Figure 6:
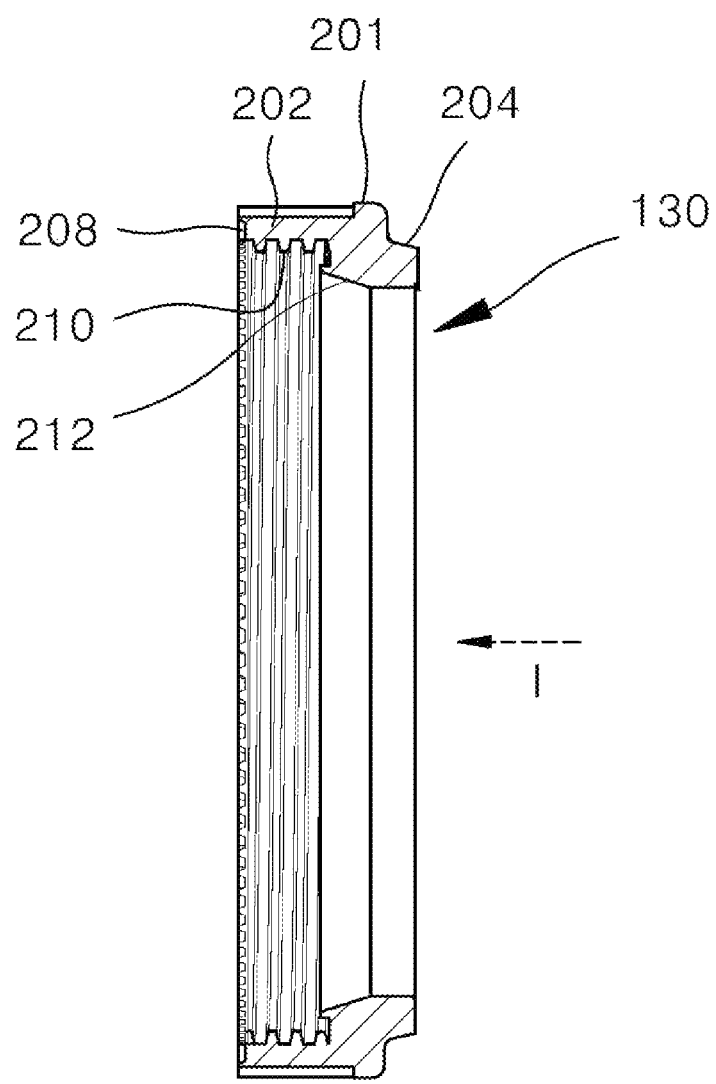
FIG. 6 is a cross-sectional view of the fixing-cap that constitutes the pipe-fitting according to one embodiment of the present disclosure.

FIG. 4 shows one distal end of a fixing-cap that constitutes the pipe-fitting according to one embodiment of the present disclosure. FIG. 5 shows the other distal end of the fixing-cap that constitutes the pipe-fitting according to one embodiment of the present disclosure. FIG. 6 is a cross-sectional view of the fixing-cap that constitutes the pipe-fitting according to one embodiment of the present disclosure.

Referring to the drawings, the fixing-cap 130 has a ring shape corresponding to the end faces of the pipe receiving portions 111 and 112 and the pipes 10 and 11.

The fixing-cap 130 has a through hole 206 defined therein through which each of the pipes 10 and 11 is inserted into each of the pipe receiving portions 111 and 112. Each of the pipes 10 and 11 is inserted in a direction from one end of the fixing-cap 130 to the other end thereof.

As shown, the fixing-cap 130 includes an annular portion 201 defining the through-hole 206 of the fixing-cap 130. Further, the fixing-cap 130 includes a skirt portion 202 extending from the other end of the annular portion 201 in the insertion direction I of each of the pipe 10 and 11.

The pipe support portion 204 is formed on one end of the annular portion 201 so as to extend stepwise to define one end of the fixing-cap 130.

The pipe support portion 204 defining one end of the fixing-cap 130 according to the present disclosure serves to increase a contact area between each of the pipe 10 and 11 and each fixing-cap 130 when each of the pipes 10 and 11 is coupled with each of the pipe receiving portions 111 and 112 through each of the through holes 206.

Conventionally, the outer diameter of each of the pipes 10 and 11 and the inner diameter of the through-hole 206 defined in the fixing-cap 130 may not be equal to each other due to a tolerance in manufacturing the pipes 10 and 11 or the pipe-fitting 100. As a result, a fluid flow space may be defined between each fixing-cap 130 and each of the pipes 10 and 11. However, according to the present disclosure, the pipe support portion 204 additionally supports each of the pipes 10 and 11 while each of the pipes 10 and 11 is coupled with each of the pipe receiving portions 111 and 112. Thus, the above-described fluid flow space and a movement of each of the pipes 10 and 11 may be significantly reduced. Therefore, a tendency that each of the pipes 10 and 11 is tilted or is detached from the pipe-fitting due to the weight of the pipes 10 and 11 themselves, and the movement and weight of fluid flowing inside the pipes may be significantly reduced.

The annular portion 201 may have a ring shape and have the through-hole 206 defined therein extending in a length direction thereof. When the fixing-cap 130 is engaged with each of the pipe receiving portions 111 and 112, the inner surface of the annular portion 201 faces inwardly of each of the pipe receiving portions 111 and 112, and the outer surface of the annular portion 201 faces outwardly of each of the pipe receiving portions 111 and 112 and fixing-cap 130. The skirt portion 202 extends from an end of the outer face of the annular portion 201 in the insertion direction I. The skirt portion 202 is formed such that its inner circumferential surface is located outwardly of the through-hole 206 in a radial direction of the annular portion Further, the fixing-cap 130 has, on an inner face thereof, a pressing portion 212 for connecting the inner circumferential face of the annular portion 201 and the inner circumferential face of the skirt portion 202. The pressing portion 212 has an inclined inner face.

The pressing portion 212 may have the inclined inner face such that a protrusion of the pressing portion 212 toward the through hole 206 gradually increases as it extends in a direction from the skirt portion 202 to the annular portion 201, while the protrusion of the pressing portion 212 toward the through hole 206 gradually decreases as it extends in a direction opposite to the direction from the skirt portion 202 to the annular portion 201.

In other words, the pressing portion 212 may have the inclined inner face such that a protrusion of the pressing portion 212 toward the through hole 206 gradually increases as it extends in a direction opposite to the insertion direction I of the pipe, while the protrusion of the pressing portion 212 toward the through hole 206 gradually decreases as it extends in the insertion direction I of the pipe.

As described below, the pressing portion 212 presses one end of the sealing member 120 in a direction toward the through-hole 206 as the fixing-cap 130 rotates around each of the pipe receiving portions 111 and 112 and is engaged with each of the ends of the pipe receiving portions 111 and 112. Accordingly, the sealing member 120 is deformed to be bent in a direction toward the through-hole 206 and is in close contact with the outer circumferential face of each of the pipe 10 and 11 passing through the through-hole 206.

Further, the thread 210 is formed on the inner circumferential face of the skirt portion 202 as shown in FIGS. 5 and 6. As the user rotates the fixing-cap 130 in a locking direction while the fixing-cap 130 is placed on the end of each of the pipe receiving portions 111 and 112, the thread 210 formed on the inner circumferential face of the skirt portion 202 is engaged In one example, as shown in FIG. 5 and FIG. 6, the plurality of fixing-protrusion receiving grooves 208 are defined in the other end of the fixing-cap 130, that is, the other end of the skirt portion 202. Each of the fixing-protrusion receiving grooves 208 receives therein each of the fixing-protrusions 172a, 172b, and 172c formed on each of the fixing-cap stoppers 140 and 141 formed on each of the outer circumferential faces of the pipe receiving portions 111 and 112 as described above with reference to FIGS. 2 and 3. Each of the fixing-protrusion receiving grooves 208 may have a size and shape corresponding to each of the fixing-protrusions 172a, 172b, and 172c.

When the fixing-cap 130 is fully engaged with each of the ends of the pipe receiving portions 111 and 112 as described later, each of the fixing protrusions 172a, 172b and 172c may be received in each of the fixing-protrusion receiving grooves 208 formed in the other end of the fixing-cap 130. Thus, when the fixing-protrusions 172a, 172b and 172c are respectively received in the fixing-protrusion receiving grooves 208 and thus the fixing-protrusion receiving grooves 208 and fixing-protrusions 172a, 172b and 172c are engaged with each other, the movement of the fixing-protrusions 172a, 172b, 172c may be disallowed by both side walls defining each of the fixing-protrusion receiving grooves 208. Thus, the coupling force between the fixing-cap 130 and each of the ends of the pipe receiving portions 111 and 112 may increase. Therefore, even when an impact or vibration is externally applied to the pipe fitting, the phenomenon that the fixing-cap 130 is automatically released from each of the ends of the pipe receiving portions 111 and 112 may be significantly reduced.

Hereinafter, a process for coupling the pipe to the pipe-fitting according to one embodiment of the present disclosure will be described in detail with reference to the drawings.

Figure 7:
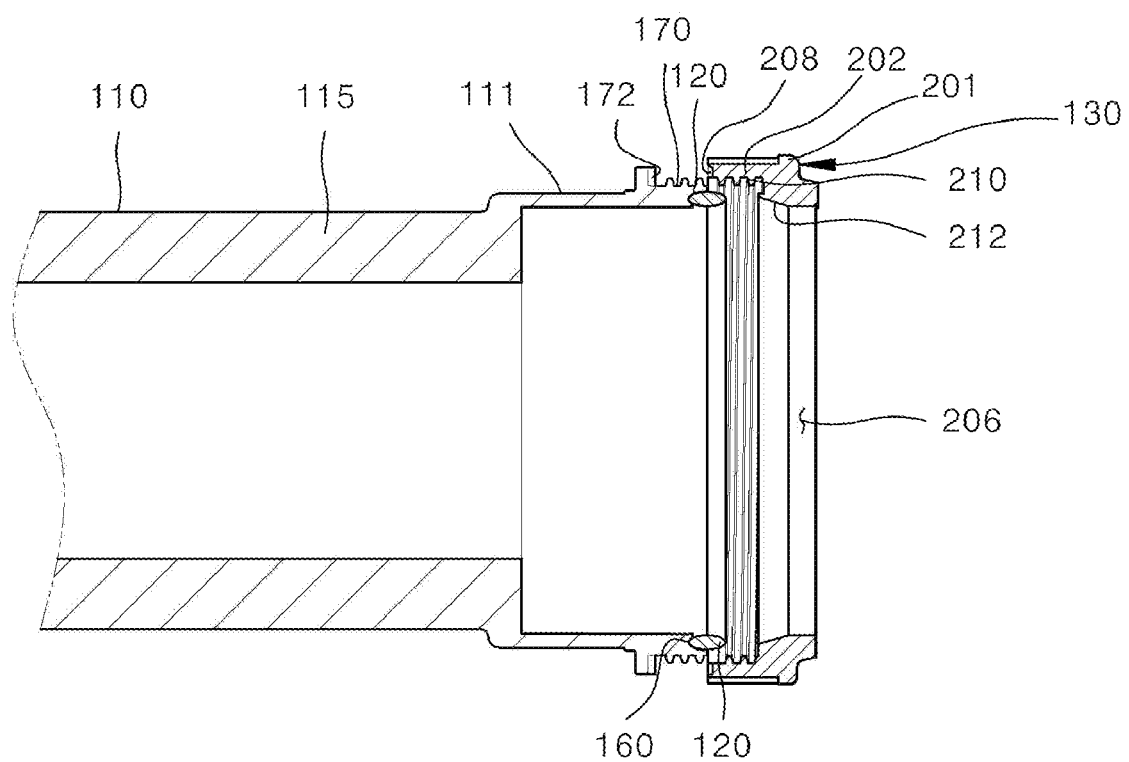
FIG. 7 shows a state in which the fixing-cap is placed on an end of the pipe-fitting after a sealing member is inserted into a sealing member receiving groove of the pipe-fitting according to one embodiment of the present disclosure.
Figure 8:
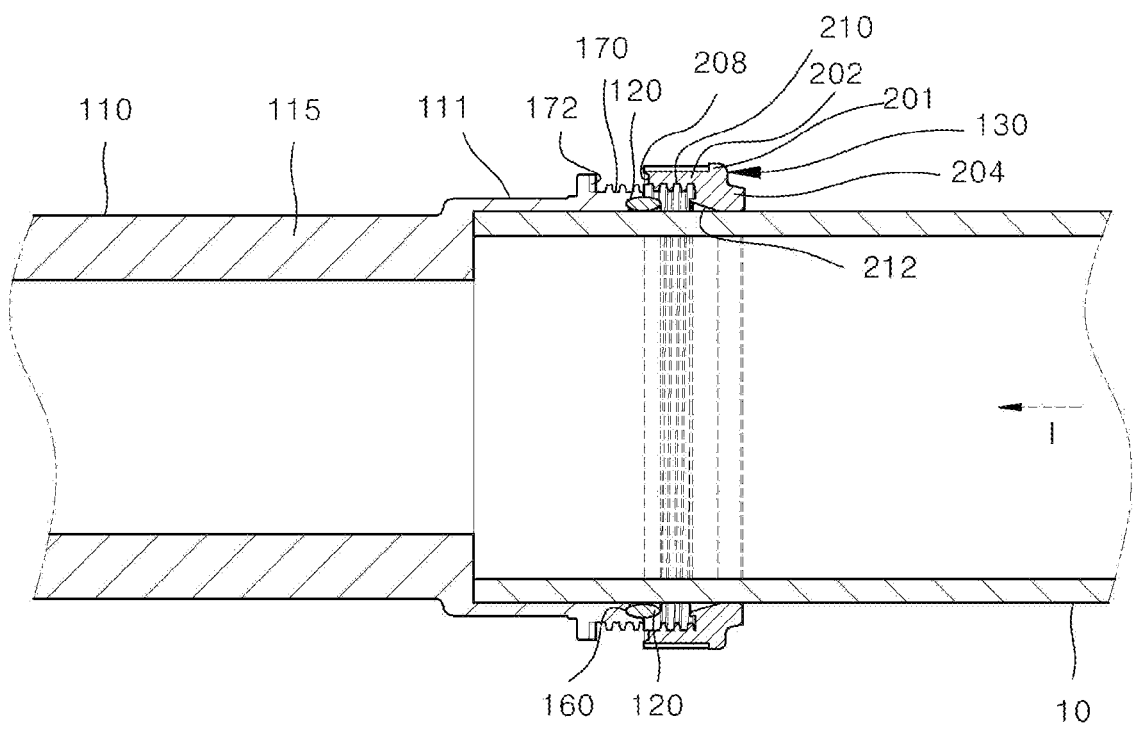
FIG. 8 shows a state which in which the pipe is inserted into the pipe-fitting through a through-hole formed in the fixing-cap of the pipe-fitting according to one embodiment of the present disclosure.
Figure 9:
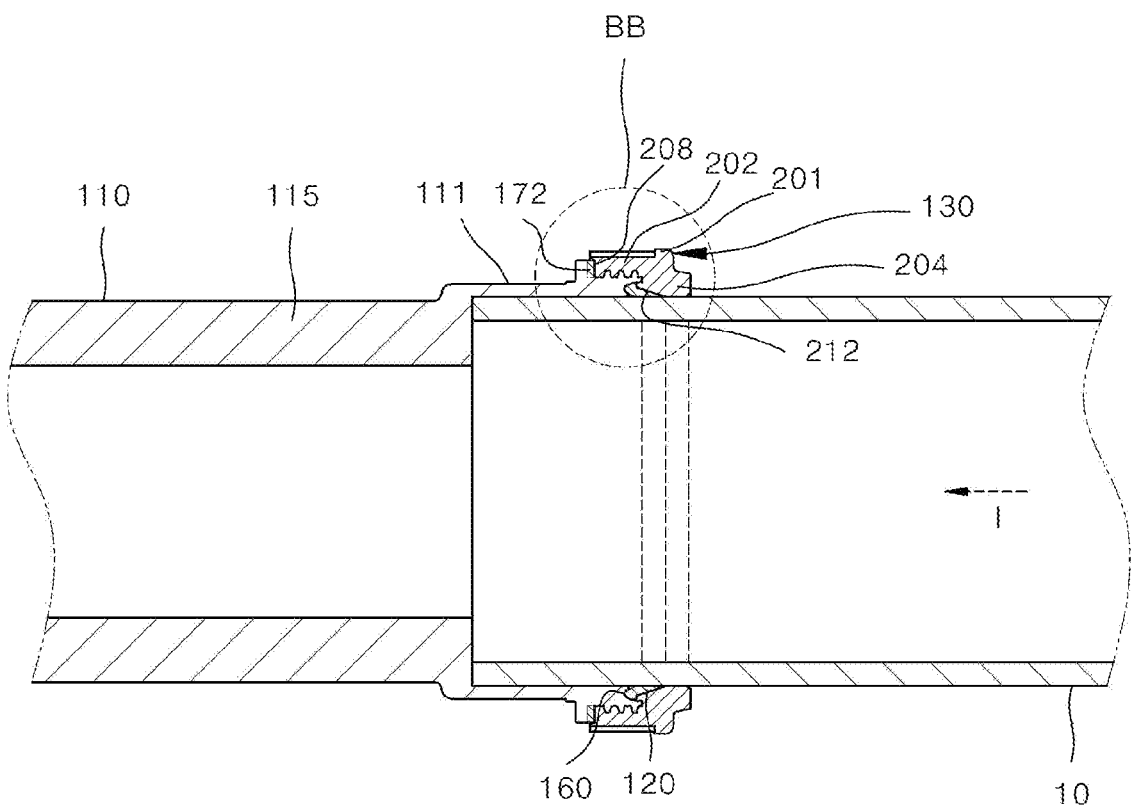
FIG. 9 shows a state in which the fixing-cap is fixed to the end of the pipe-fitting by rotating the fixing-cap while the pipe has been inserted into the pipe-fitting according to one embodiment of the present disclosure.

FIG. 7 shows a state in which the fixing-cap is placed on an end of the pipe-fitting after a sealing member is inserted into a sealing member receiving groove of the pipe-fitting according to one embodiment of the present disclosure. FIG. 8 shows a state which in which the pipe is inserted into the pipe-fitting through a through-hole formed in the fixing-cap of the pipe-fitting according to one embodiment of the present disclosure. FIG. 9 shows a state in which the fixing-cap is fixed to the end of the pipe-fitting by rotating the fixing-cap while the pipe has been inserted into the pipe-fitting according to one embodiment of the present disclosure.

A user intending joining a pipe to a pipe-fitting according to one embodiment of the present disclosure first inserts the sealing member 120 into the sealing member receiving groove 160 as shown in FIG. 7. When the sealing member 120 is inserted into the sealing member receiving groove 160, one end of the sealing member 120 is exposed to the outside of the end of the pipe receiving portion 111.

Further, as shown in FIG. 7, after inserting the sealing member 120 into the sealing member receiving groove 160, the user places the fixing-cap 130 on the end of the pipe receiving portion 111.

Next, while the fixing-cap 130 is not screwed onto the pipe receiving portion 111, the user inserts the pipe 10 into the pipe receiving portion 111 in the insertion direction I as shown in FIG. 8.

After inserting the pipe 10 into the pipe receiving portion 111, the user rotates the fixing-cap 130 in the locked direction. Accordingly, the fixing-cap 130 is gradually coupled with the pipe receiving portion 111 in the insertion direction I. When the fixing-cap 130 is completely rotated, the fixing-cap 130 is fully engaged with the pipe receiving portion 111 as shown in FIG. 9.

When the pipe-fitting according to the present disclosure is coupled with the pipe 10, the sealing member 120 is inserted into the sealing member receiving groove 160, and, then, the pipe 10 is inserted into the pipe receiving portion 111 while the fixing-cap 130 is unscrewed from the receiving portion 111, and, then, the fixing-cap is screwed to the receiving portion 111. Further, while the pipe 10 and the pipe receiving portion 111 are coupled to each other, the fixing-cap 130 is rotated to separate the fixing-cap 130 from the pipe receiving portion 111 such that the pipe 10 can be separated from the pipe receiving portion 111 very easily. The coupling structure between the pipe-fitting and the pipe 10 using the sealing member 120 and the fixing-cap 130 may be referred to as "one-touch fitting structure".

In short, using the pipe-fitting according to the present disclosure may easily realize the coupling and separation between the pipe-fitting and the pipe 10 using a small force.

Figure 10:
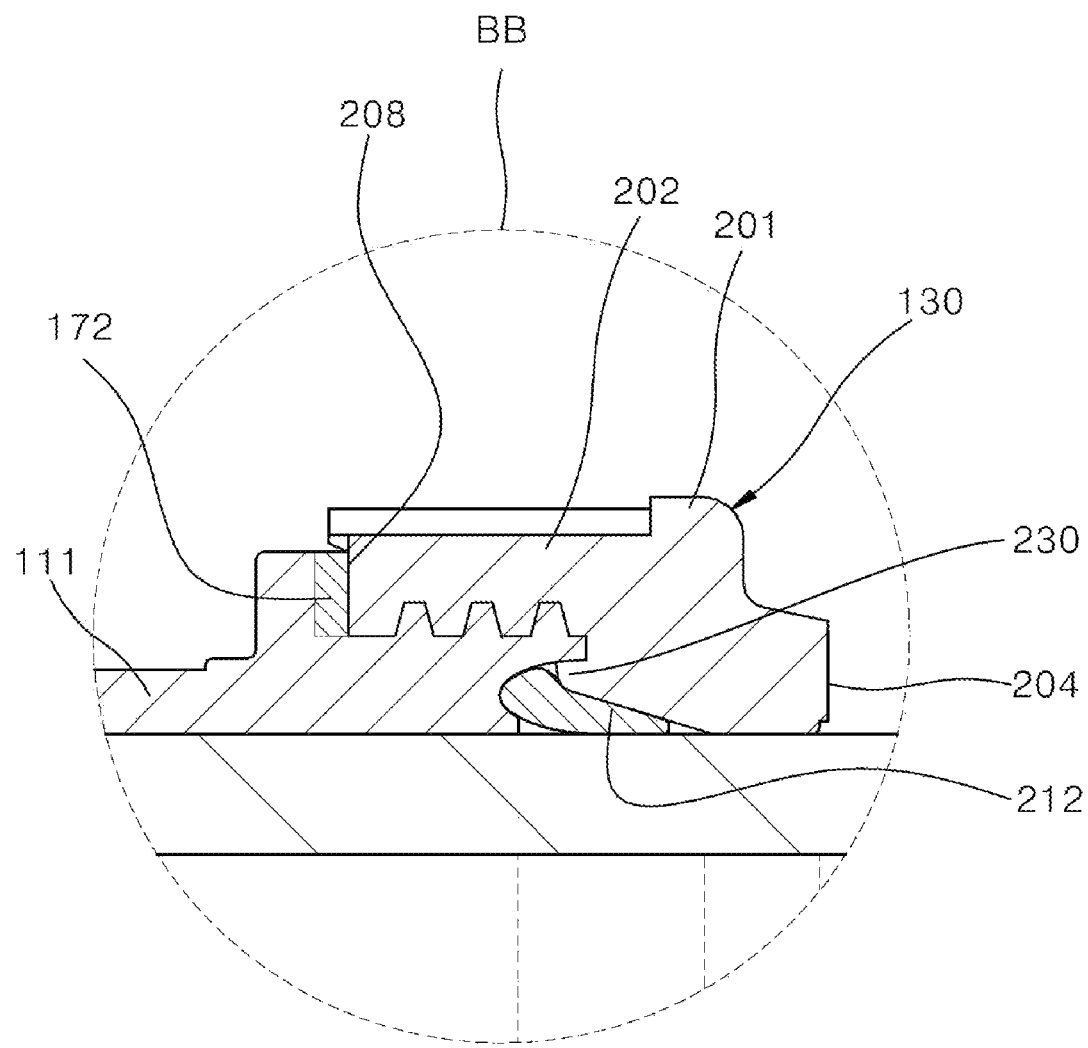
FIG. 10 is an enlarged view of a BB portion shown in FIG. 9.

The fixing-cap 130 may be gradually connected to the pipe receiving portion 111 as shown in FIG. 8 while the pipe 10 is inserted into the pipe receiving portion 111. Thus, the pressing portion 212 formed between the annular portion 201 and the skirt portion 202 of the fixing-cap 130 gradually comes closer to one end of the sealing member 120. Eventually, as shown in FIG. 9 and FIG. 10, when the fixing-cap 130 is fully engaged with the pipe receiving portion 111, one end of the sealing member 120, which is exposed to the outside of the end of the pipe receiving portion 111 may be pressed and deformed to be bent by the pressing portion 212.

The one end of the sealing member 120 is simultaneously subjected to a force in a direction toward the insertion direction I of the pipe 10 and a force in a direction toward the pipe 10 via the inclined surface of the pressing portion 212 as shown. Accordingly, the sealing member 120 may be deformed to be bent to closely contact the pipe 10.

In this way, the sealing member 120 is deformed to be bent by the pressing portion 212 so as to be brought into close contact with the pipe 10, such that the hollow space defined by the end of the pipe receiving portion 111, the skirt portion 202 and the pressing portion 212 of the fixing-cap 130, and the pipe 10 may be sealed by the sealing member 120. Due to the sealing action, the fluid flowing inside the pipe 10 may be prevented from flowing out through the space defined by the end of the pipe receiving portion 111, the skirt portion 202 and the pressing portion 212 of the fixing-cap 130, and the pipe 10.

Further, the sealing member 120 may be deformed to be bent by the pressing portion 212 so as to be brought into close contact with the pipe 10 such that a frictional force is generated between the sealing member 120 and the pipe 10. In addition, due to the pressure applied by the pressing portion 212, the sealing member 120 exerts a pushing force on the pipe 10 in the insertion direction I. Because of this frictional force and the force direction, the pipe 10 and the pipe receiving portion 111 are firmly fixed to each other, such that the phenomenon in which the pipe 10 is separated from the pipe receiving portion 111 due to an external shock or vibration is remarkably reduced.

When the fixing-cap 130 is fully engaged with the pipe receiving portion 111 as shown in FIGS. 9 and 10, the fixing-protrusion 172 formed on the outer circumferential face of the pipe receiving portion 111 is received in the fixing-protrusion receiving groove 208 defined in the other end of the fixing-cap 130. When the fixing-protrusion 172 is received in the fixing-protrusion receiving groove 208, the movement of the fixing-protrusion 172 is blocked by the side walls defining the fixing-protrusion receiving groove 208. Accordingly, the fixing-cap 130 is more tightly coupled with the pipe receiving portion 111, such that the phenomenon that the fixing-cap 130 is spontaneously unscrewed from the pipe receiving portion 111 due to external impact or vibration is remarkably reduced.

FIG. 10 is an enlarged view of a BB portion shown in FIG. 9. Further, as shown in FIG. 10, a pressing protrusion 230 protruding in the insertion direction I of the pipe 10 is formed from the end of the pressing portion 212. When the fixing-cap 130 is fully engaged with the pipe receiving portion 111, the pressing protrusion 230 presses the sealing member 120 in the direction toward the pipe 10. Particularly, as shown in the drawing, an end of the pressing protrusion 230 has a shape that becomes narrower in a direction away from the pressing portion 212, so that the force applied to the sealing member 120 by the pressing protrusion 230 is increased. As a result, the coupling force between the fixing-cap 130 and the pipe 10 is further increased.

Figure 11:
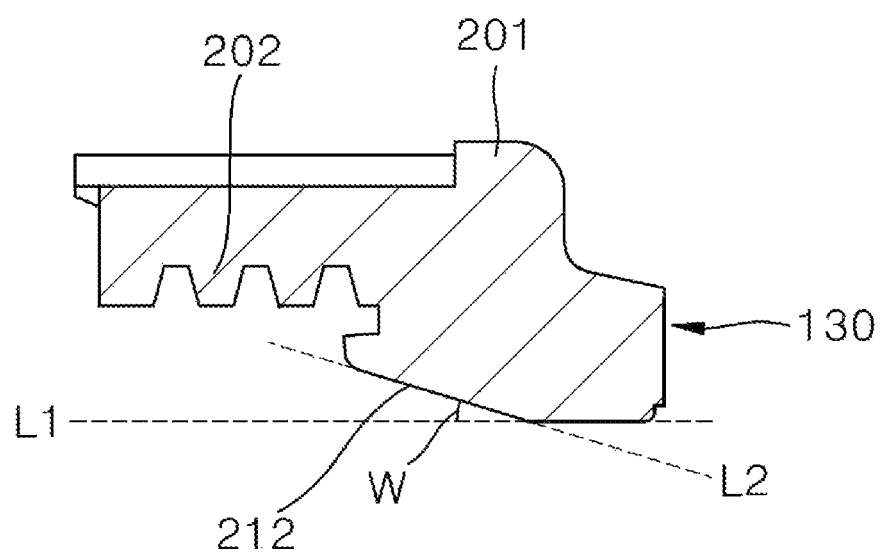
FIG. 11 shows an angle between an annular portion and a pressing portion of the fixing-cap according to one embodiment of the present disclosure.

FIG. 11 shows an angle between an annular portion and a pressing portion of the fixing-cap according to one embodiment of the present disclosure.

As previously described, the fixing-cap 130 according to one embodiment of the present disclosure includes the pressing portion 212 having an inclined face between the annular portion 201 and the skirt portion 202. In this connection, the angle defined between the inner circumferential face L1 of the annular portion 201 and the inclined face L2 of the pressing portion 212 is defined as an inclination angle W of the pressing portion 212, as shown in FIG. 11.

As described above, the fixing-cap 130 according to one embodiment of the present disclosure is coupled to the pipe receiving portion 111 in a thread engagement scheme. In order to join the fixing-cap 130 with the pipe receiving portion 111, the user must rotate the fixing-cap 130 in the locking direction. At this time, as the force applied to the fixing-cap 130 by the user in order to rotate the fixing-cap 130 in the locking direction increases, the manpower and time required for the construction in the field increase.

However, according to one embodiment of the present disclosure, the sealing member 120 is pressed by the inclined surface of the pressing portion 212 of the inner face of the fixing-cap 130. Thus, the force to be applied to the fixing-cap 130 to rotate the fixing-cap 130 in the locking direction by the user may decrease.

For example, when the inclination angle W of the pressing portion 212 is set to 90 degrees, the elastic force of the sealing member 120 in contact with the pressing portion 212 acts as a resistance force against rotating the fixing-cap 130, such that the user must exert more force to rotate the fixing-cap 130. However, when the inclination angle W of the pressing portion 212 is set to a value smaller than 90 degrees, the pressing portion 212 presses the sealing member 120 in the direction toward the pipe, such that the resistance against the rotation of the fixing-cap due to the elastic force of the sealing member 120 is reduced.

[Table 1] shows the tightening performance of the fixing-cap 130 according to the inclination angle W of the pressing portion 212 measured through the experiment. In this connection, the tightening performance of the fixing-cap 130 means the amount of force (torque) required for the user to fully engage the fixing-cap 130 with the pipe receiving portion 111, and a portion thereof is N·m. The lower the tightening performance value of the fixing-cap 130, the better the tightening performance of the fixing-cap 130.

TABLE 1

| Inclination angle (°) of pressing portion 212 | Tightening performance (N · m) of fixing cap 130 |
| --- | --- |
| 64 | 77.4 |
| 48 | 73 |
| 32 | 70.2 |
| 22 | 59.7 |
| 20 | 54.4 |
| 17 | 45.8 |
| 14 | 40.2 |
| 10 | 30.4 |
| 8 | 26.3 |

As shown in Table 1, the greater the inclination angle W of the pressing portion 212, the greater the force required to completely engage the fixing-cap 130 with the pipe receiving portion 111. The experimental results show that the tightening performance of the fixing-cap 130 should be kept below 60 N·m so that the user can easily join the fixing-cap 130 with the pipe receiving portion 111. Further, it may be confirmed that the tightening performance value is 60 N·m or lower when the inclination angle W of the pressing portion 212 is 22 degrees or lower.

As described above, when the fixing-cap 130 according to one embodiment of the present disclosure is combined with the pipe receiving portion 111, the pressing portion 212 of the fixing-cap 130 presses the sealing member 120 in the insertion direction I and pipe 10 and in the direction toward the pipe 10, thereby bring the sealing member 120 in close contact with the pipe 10. Accordingly, the sealing member 120 tightens the pipe 10 in the radial direction, such that the phenomenon that the pipe 10 is separated from the pipe-fitting is remarkably reduced.

Table 2 shows the coupling performance of the fixing-cap 130 according to the inclination angle W of the pressing portion 212 measured through the experiment. In this connection, the coupling performance of the fixing-cap 130 means a load applied to the pipe at a speed of 10 mm/min in a direction opposite to the insertion direction I of the pipe 10 while the fixing-cap 130 is fully engaged with the pipe receiving portion 111 until the pipe 10 is completely separated from the pipe receiving portion 111, and a portion of the coupling performance is kgf. The higher the coupling performance value of the fixing-cap 130, the better the coupling performance of the fixing-cap 130.

TABLE 2

| Inclination angle (°) of pressing portion 212 | Coupling performance (kgf) of fixing cap 130 |
| --- | --- |
| 64 | 124.1 |
| 48 | 126 |
| 32 | 123.6 |
| 22 | 129.5 |
| 20 | 128.7 |
| 17 | 127.2 |
| 14 | 126.3 |
| 10 | 119.8 |
| 8 | 116.5 |

The coupling performance value of the fixing-cap 130 changes according to the inclination angle W of the pressing portion 212 as shown in [Table 2]. From the result of the experiment, when the coupling performance value of the fixing-cap 130 is maintained at 120 kgf or greater, the pipe 10 may not be easily detached from the pipe receiving portion 111. Thus, it is confirmed that when the inclination angle W of the pressing portion 212 is 14 degrees or greater, the coupling performance value of the fixing-cap 130 is 120 kfg or greater.

As may be seen from the above experimental results, in order to maintain the coupling performance value of the fixing-cap 130 at 120 kgf or greater while maintaining the force required for the user to completely fix the fixing-cap 130 to the pipe receiving portion 111 at 60 N·m or lower, it is most preferable that the inclination angle W range of the pressing portion 212 is set to be in a range of 14 to 22 degrees.

Although the present disclosure has been described with reference to the drawings illustrating the present disclosure, it should be understood that the present disclosure is not limited to the embodiments and drawings disclosed in the present specification. It will be understood that various modifications may be made thereto by those skilled in the art without departing from the spirit and scope of the present disclosure. In addition, it should be appreciated that effects expected from the configurations of the present disclosure should be acknowledged even though the expected effects have not been explicitly described herein.

What is claimed is:

1. A pipe-fitting comprising:
a main body including: a plurality of pipe receiving portions for receiving a plurality of pipes therein respectively; and a hollow joint for connecting the plurality of pipe receiving portions to each other;
a sealing member received in a sealing member-receiving groove defined in a distal end of each pipe receiving portion of the plurality of pipe receiving portions, wherein the sealing member is configured to seal between each pipe receiving portion and each pipe inserted into each pipe receiving portion; and
a plurality of fixing-caps having a through-hole defined therein through which each pipe of the plurality of pipes passes, respectively, wherein each fixing-cap of the plurality of fixing-caps is screwed to the distal end of each pipe receiving portion to press the sealing member to be brought into close contact with each pipe,
wherein a fixing-cap stopper is formed on an outer circumferential face of the distal end of each pipe receiving portion, wherein the fixing-cap stopper contacts a proximal end of the fixing-cap when each fixing-cap is screwed to the distal end of each pipe receiving portion,
wherein the fixing-cap stopper includes a fixing-cap fixing portion including a plurality of fixing protrusions protruding toward the proximal end of the fixing-cap and in the opposite direction to the insertion direction of each pipe,
wherein a plurality of fixing-protrusion-receiving grooves is defined in the proximal end of each fixing-cap for receiving the fixing-protrusions therein respectively,
wherein each fixing-cap includes:
an annular portion defining the through-hole;
a skirt portion extending from an edge of the annular portion in an insertion direction of each pipe; and
a pressing portion formed between an inner circumferential surface of the annular portion and an inner circumferential surface of the skirt portion,
wherein a pressing protrusion extends from a proximal end of the pressing portion in the insertion direction of each pipe, and the pressing portion has an inner inclined surface having a predetermined inclination angle extending to the pressing protrusion with respect to the inner circumferential surface of the annular portion, and wherein the inclination angle is in a range of 14 and 22 degrees.

2. The pipe-fitting of claim 1, wherein a pipe support portion is formed on the distal end of each fixing-cap so as to extend stepwise to define the distal end of each fixing-cap.

3. The pipe-fitting of claim 1, wherein when each fixing-cap is screwed to the distal end of each pipe receiving portion and the sealing member is received in the sealing member-receiving groove, the pressing portion presses the sealing member so that at least a portion of the sealing member is deformed to be bent so as to be brought into close contact with each pipe.

4. The pipe-fitting of claim 1, wherein when each fixing-cap is screwed to the distal end of each pipe receiving portion, each fixing-protrusion is received in each fixing-protrusion receiving groove to prevent rotation of each fixing-cap.

5. The pipe-fitting of claim 1, wherein the fixing-cap fixing portion includes a plurality of fixing-cap fixing portions arranged on the fixing-cap stopper and spaced from each other by the same spacing.

6. The pipe-fitting of claim 1, wherein each pipe is connected to the pipe-fitting by the steps of:

inserting the sealing member into the sealing member-receiving groove;

placing each fixing-cap on the distal end of each pipe receiving portion;

inserting each pipe through the through-hole of each fixing-cap into each pipe receiving portion; and rotating each fixing-cap in a locking direction to be screwed to each pipe receiving portion.

\* \* \* \* \*